(No Model.)
H. N. TIMMS.
MOVABLE STAND FOR BICYCLES.
No. 568,053. Patented Sept. 22, 1896.
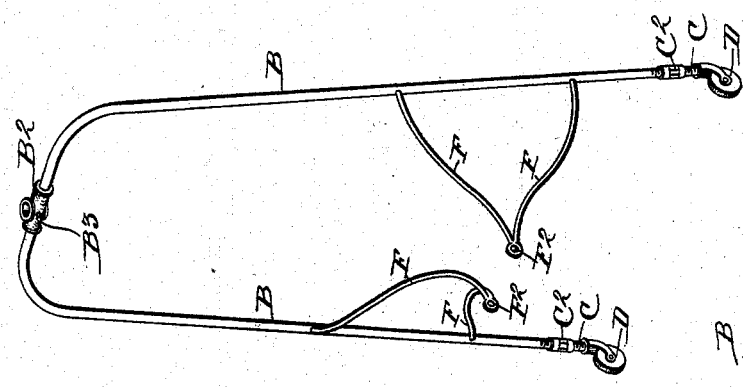
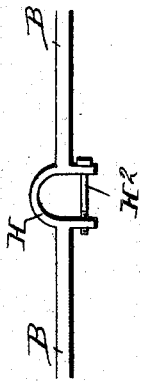
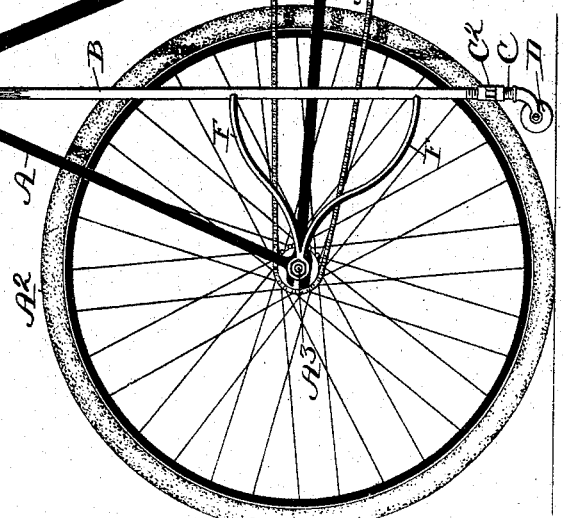

UNITED STATES PATENT OFFICE.

HARVEY N. TIMMS, OF DES MOINES, IOWA.

MOVABLE STAND FOR BICYCLES.

SPECIFICATION forming part of Letters Patent No. 568,053, dated September 22, 1896.

Application filed April 23, 1895. Serial No. 546,841. (No model.)

*To all whom it may concern:*

Be it known that I, HARVEY N. TIMMS, a citizen of the United States of America, residing at Des Moines, in the county of Polk and State of Iowa, have invented a Movable Stand for Bicycles, of which the following is a specification.

The object of this invention is to provide a simple, strong, and durable device adapted to be detachably connected with a bicycle to provide a firm lateral support therefor to serve as a stand for exhibiting and selling bicycles, to aid beginners in acquiring the art of balancing a bicycle, and to adapt a bicycle to the use of aged people.

My invention consists in the construction of the support and the arrangement and combination thereof with a bicycle, as hereinafter set forth, pointed out in my claim, and illustrated in the accompanying drawings, in which—

Figure 1 is a side elevation of a portion of a bicycle, showing the support attached. Fig. 2 is a perspective view of the device detached. Fig. 3 is a detail perspective view of a modified form.

Referring to the accompanying drawings, the reference-letter A is used to indicate the bicycle-frame; $A^2$, the rear wheel; $A^3$, the axle thereof, and $A^4$ the seat-post. These parts, as well as the remainder of the bicycle, are of common construction.

The stand proper comprises two uprights B of such a length as to extend from a point near the ground-surface to the seat-post $A^4$.

$B^2$ indicates a short pipe-section having a vertical opening to admit the seat-post and internally screw-threaded at each end to admit the tubes B. The frame thus formed may be secured to the seat-post by a set-screw $B^3$, extended through the section B. At the lower end of each upright B a short section C is connected therewith by means of a collar $C^2$, internally screw-threaded at its ends in opposite directions and made angular at its central portion, so that a wrench may be applied thereto and the lower section of the tube adjusted vertically. D indicates a caster-wheel secured to the end of each of the said sections $B^2$. These parts are so arranged that the caster-wheels are each elevated a slight distance from the ground-surface when the bicycle is straight upright.

F indicates braces secured to the upright B and brought together at their ends and provided with an opening $F^2$, adapted to admit the axle of the rear wheel and be secured thereto by means of the nuts on the ends of the axle. A like brace is supplied on each side.

In practical use the device is applied to a bicycle by first removing the seat-post and passing the same through the opening in the pipe-section $B^2$, where it is clamped by means of the set-screw $B^3$. The braces are then clamped to the rear axle by first removing the nuts from the axle, then passing the ends of the axle through the openings in the braces, and finally tightening the nuts. The device is then firmly held in place, cannot mar the finish of the machine-frame, and will prevent the bicycle from falling laterally in either direction.

In Fig. 3 the uprights B are connected at their top central portions and curved in a semicircle at H to admit a seat-post.

$H^2$ indicates a bolt passed through the ends of the part H, whereby the clamp may be tightly secured to a seat-post. With this form it is not necessary to remove the seat to attach the support.

Having thus described my invention, what I claim as new therein, and desire to secure by Letters Patent of the United States therefor, is—

A support for bicycles comprising an upright designed to be connected with the frame of a bicycle at or near the seat-post, casters adjustably mounted in its lower ends on opposite sides of the bicycle and braces connected with the uprights and having openings in their ends whereby they may be attached to the rear axle of a bicycle substantially as and for the purposes stated.

HARVEY N. TIMMS.

Witnesses:
J. RALPH ORWIG,
THOMAS G. ORWIG.